United States Patent
Nakamura et al.

(10) Patent No.: US 10,235,805 B2
(45) Date of Patent: Mar. 19, 2019

(54) CLIENT TERMINAL AND SERVER FOR GUIDING A USER

(71) Applicant: SONY CORPORATION, Tokyo (JP)

(72) Inventors: Takatoshi Nakamura, Kanagawa (JP); Yoichiro Sako, Tokyo (JP); Akira Tange, Tokyo (JP); Mitsuru Takehara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 142 days.

(21) Appl. No.: 13/752,701

(22) Filed: Jan. 29, 2013

(65) Prior Publication Data
US 2013/0229535 A1 Sep. 5, 2013

(30) Foreign Application Priority Data
Mar. 5, 2012 (JP) ................................ 2012-048144

(51) Int. Cl.
*G06T 19/00* (2011.01)
*H04N 5/225* (2006.01)
*H04N 5/232* (2006.01)

(52) U.S. Cl.
CPC .......... *G06T 19/006* (2013.01); *H04N 5/225* (2013.01); *H04N 5/23293* (2013.01)

(58) Field of Classification Search
CPC ... H04N 5/23293; H04N 5/272; G06T 19/006
USPC ............... 348/333.02; 345/632, 633
See application file for complete search history.

(56) References Cited

U.S. PATENT DOCUMENTS

| | | | |
|---|---|---|---|
| 7,720,436 B2 * | 5/2010 | Hamynen et al. | 455/456.1 |
| 8,373,725 B2 * | 2/2013 | Ryu et al. | 345/633 |
| 8,681,178 B1 * | 3/2014 | Tseng | G06T 19/006 |
| | | | 345/629 |
| 2009/0167919 A1 * | 7/2009 | Anttila | G01C 21/20 |
| | | | 348/333.02 |
| 2011/0221771 A1 * | 9/2011 | Cramer | G06Q 30/02 |
| | | | 345/633 |
| 2012/0019557 A1 * | 1/2012 | Aronsson et al. | 345/633 |
| 2012/0058801 A1 * | 3/2012 | Nurmi | G06T 19/006 |
| | | | 455/566 |
| 2012/0092369 A1 * | 4/2012 | Kim | G06T 11/00 |
| | | | 345/633 |
| 2012/0096403 A1 * | 4/2012 | Jung et al. | 715/817 |
| 2012/0098859 A1 * | 4/2012 | Lee et al. | 345/633 |
| 2012/0105476 A1 * | 5/2012 | Tseng | G01C 21/3611 |
| | | | 345/633 |

(Continued)

FOREIGN PATENT DOCUMENTS

| | | | |
|---|---|---|---|
| IL | 208600 | * | 6/2011 |
| JP | 2006-260338 | | 9/2006 |
| WO | WO 2011093598 A2 | * | 8/2011 |

OTHER PUBLICATIONS

U.S. Appl. No. 13/751,370, filed Jan. 28, 2013, Sako, et al.

*Primary Examiner* — John Villecco

(74) *Attorney, Agent, or Firm* — Chip Law Group

(57) ABSTRACT

There is provided a client terminal including a determination unit that determines, based on position information associated with a particular object, whether the particular object is included in an angle of view visually recognized by a user, and a guidance unit that guides the user when the determination unit determines that the particular object is not included in the angle of view visually recognized by the user.

14 Claims, 15 Drawing Sheets

(56) References Cited

U.S. PATENT DOCUMENTS

2012/0127201 A1* 5/2012 Kim et al. .................... 345/633
2012/0148106 A1* 6/2012 Sung et al. ................... 345/633
2012/0223966 A1* 9/2012 Lim ............................. 345/633
2012/0240077 A1* 9/2012 Vaittinen et al. ............. 715/781
2013/0187952 A1* 7/2013 Berkovich et al. ........... 345/633

* cited by examiner

FIG. 3

| OBJECT | POSITION INFORMATION | CLASSIFICATION INFORMATION |
|---|---|---|
| A GATE | POSITION INFORMATION P-1 | GATE |
| B BUILDING | POSITION INFORMATION P-2 | BUILDING |
| C HOTEL | POSITION INFORMATION P-3 | HOTEL |
| D TOWER | POSITION INFORMATION P-4 | TOWER |
| ... | ... | ... |

FIG. 6
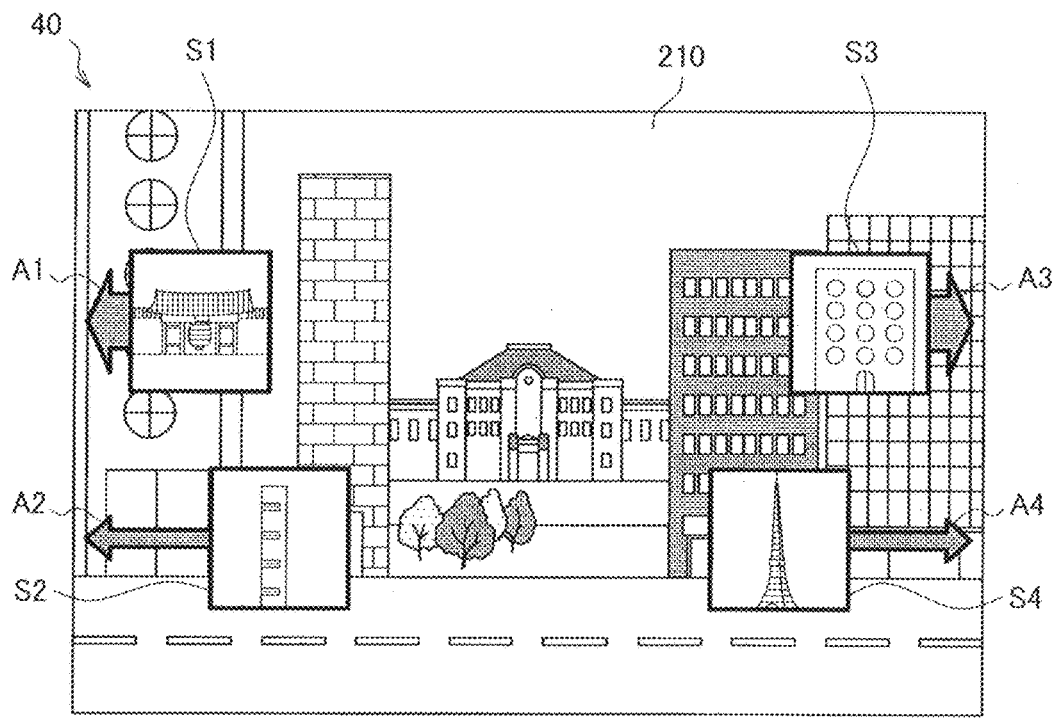
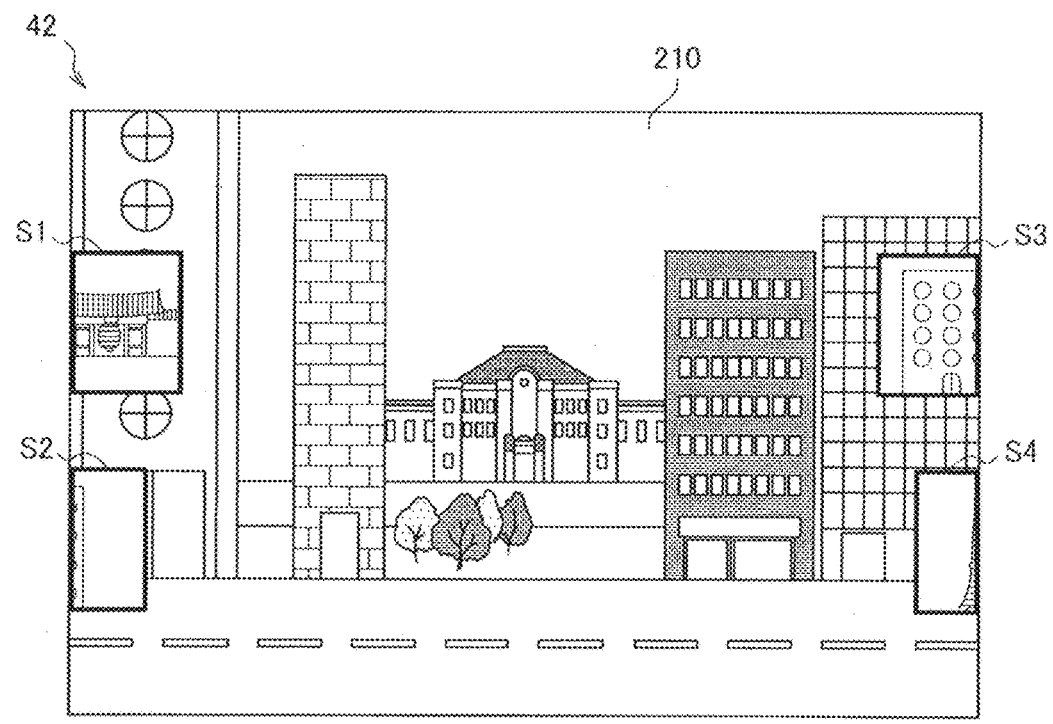

FIG. 9
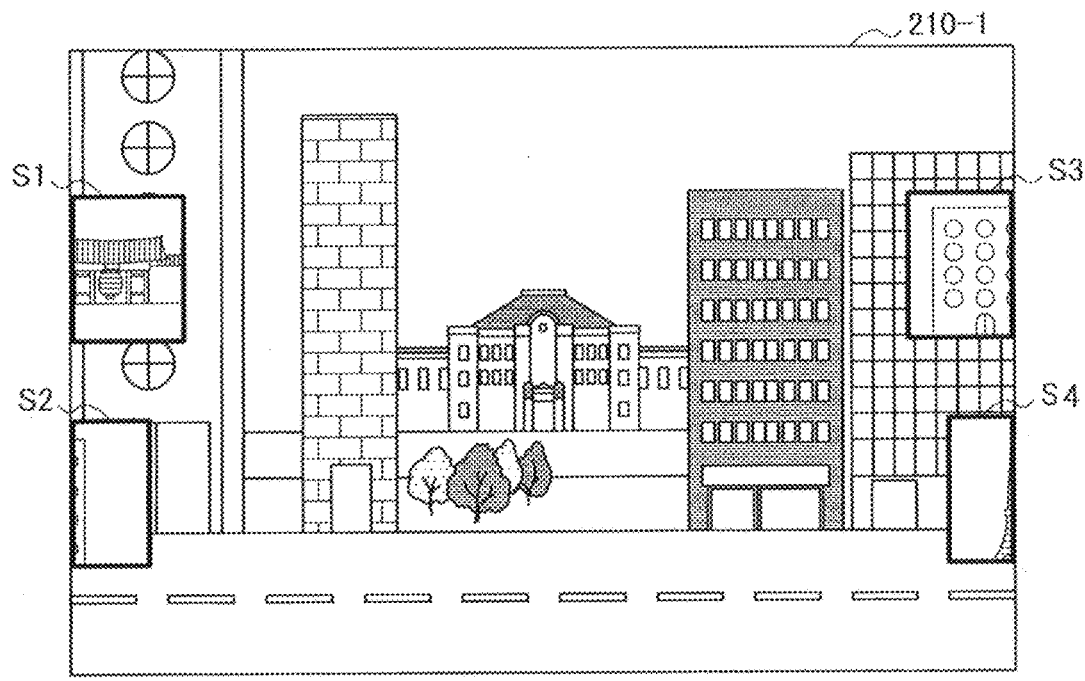
DIRECT IMAGE CAPTURING DIRECTION TOWARD RIGHT
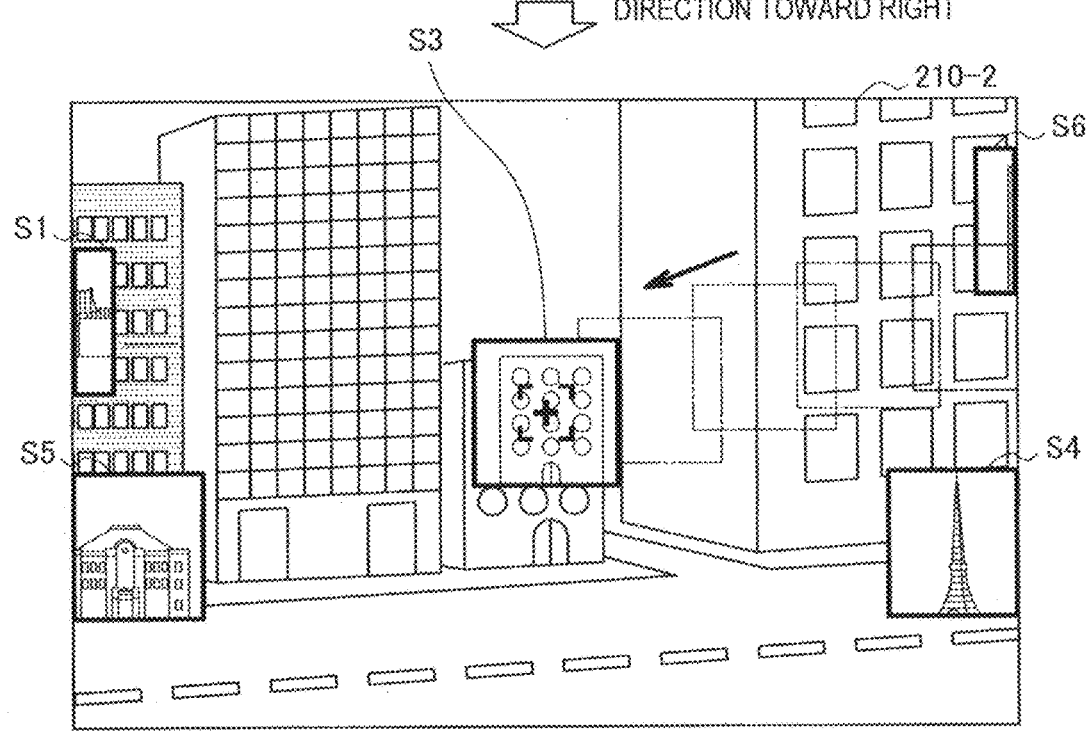

CLIENT TERMINAL AND SERVER FOR GUIDING A USER

BACKGROUND

The present disclosure relates to a client terminal, a server and a program.

In recent years, a digital camera has been widely used that stores and preserves a subject image in a recording medium as a digital image signal. A user directs the digital camera toward a subject, visually recognizes an image displayed on a viewfinder and presses the shutter button at a given timing.

Here, JP 2006-260338A proposes a digital camera capable of acquiring past and future images of a particular subject as a technology related to the above-mentioned camera. The digital camera described in JP 2006-260338A transmits, to a server, information, for example, a year, month, day and the position of the digital camera in the past indicated by the user. Then, the digital camera acquires, from the server, an image that corresponds to the indicated year, month and day. The digital camera then displays the image acquired from the server in accordance with the timing at which the user presses the shutter button.

SUMMARY

The digital camera described in JP 2006-260338A allows a user to experience a virtual time travel by displaying past/future images of scenery that the user is currently looking at.

However, in using a typical digital camera or the digital camera described in JP 2006-260338A, the user has to direct the digital camera toward a subject that he/she hopes to capture so that he/she has to search for a direction in which he/she can visually recognize the subject.

In addition, when the user searches for a subject by observing a viewfinder, no information regarding a subject that is not shown in the viewfinder is presented to the user.

Therefore, the present disclosure proposes a client terminal, a server and a program that are novel and improved and are capable of guiding a user in a direction in which the user can visually recognize a particular object.

According to an embodiment of the present disclosure, there is provided a client terminal including a determination unit that determines, based on position information associated with a particular object, whether the particular object is included in an angle of view visually recognized by a user, and a guidance unit that guides the user when the determination unit determines that the particular object is not included in the angle of view visually recognized by the user.

According to another embodiment of the present disclosure, there is provided a server including a storage unit that stores position information associated with a particular object, a receiving unit that receives, from a client terminal, visual recognition information for estimating an angle of view visually recognized by a user, a determination unit that determines, based on the position information, whether the particular object is included in the angle of view, which is estimated based on the visual recognition information, visually recognized by the user, and a transmitting unit that transmits, to the client terminal, control information for guiding the user when the determination unit determines that the particular object is not included in the angle of view visually recognized by the user.

According to the embodiments of the present disclosure described above, there is provided a recording medium having a program recorded thereon, the program being configured to cause a computer to execute a process of determining, based on position information associated with a particular object, whether the particular object is included in an angle of view visually recognized by a user, and a process of guiding the user when the process of determining determines that the particular object is not included in the angle of view visually recognized by the user.

According to the embodiments of the present disclosure described above, there is provided a recording medium having a program recorded thereon, the program being configured to cause a computer to execute a process of receiving, from a client terminal, visual recognition information for estimating an angle of view visually recognized by a user, a process of determining, based on position information associated with the particular object, whether the particular object is included in the angle of view, which is estimated based on the visual recognition information, visually recognized by the user, and a process of transmitting, to the client terminal, control information for guiding the user when the process of determining determines that the particular object is not included in the angle of view visually recognized by the user.

In accordance with the embodiments of the present disclosure, as described above, it is possible to guide a user in a direction in which a particular object can be visually recognized.

BRIEF DESCRIPTION OF THE DRAWINGS

FIG. 3 is a diagram illustrating an example of data stored in an object DB in accordance with the first embodiment;

FIG. 6 is a diagram illustrating an example of a guidance screen in accordance with the first embodiment;

FIG. 9 is a diagram describing transition of the guidance screen in response to a change of the image capturing direction in accordance with the first embodiment;

DETAILED DESCRIPTION OF THE EMBODIMENT(S)

Figure 1:
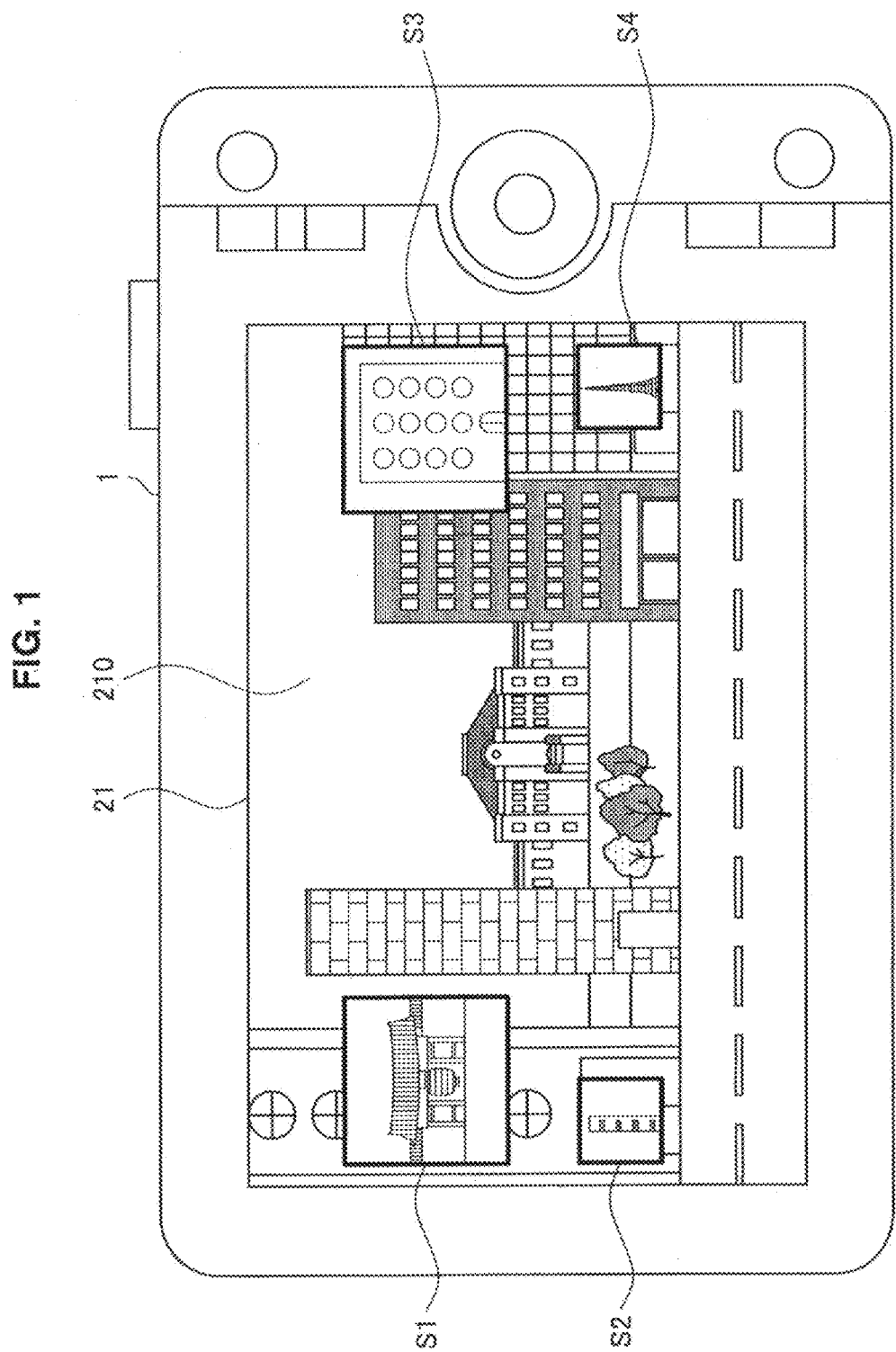
FIG. 1 is a diagram describing an overview of a guidance system in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described in the following order.

1. Overview of guidance system in accordance with embodiment of present disclosure
2. Embodiments
2-1. First embodiment
2-1-1. Configuration of digital camera
2-1-2. Guidance process
2-1-3. Examples of guidance screen
2-2. Second embodiment
2-3. Third embodiment
2-4. Fourth embodiment
3. Conclusion 1. Overview of Guidance System in Accordance with Embodiment of Present Disclosure First, an overview of a guidance system in accordance with an embodiment of the present disclosure will be described with reference to FIG. 1. As illustrated in FIG. 1, in a digital camera 1, which is an example of a client terminal, an image (a real image 210) obtained by capturing real space is displayed on a viewfinder (a display unit 21) in the guidance system in accordance with the embodiment of the present disclosure. Then, thumbnails S1 to S4 that are guidance images for guiding a user to particular objects not included in the angle of view visually recognized by the user (specifically, not shown in the real image 210) are displayed on ends of a screen corresponding to directions in which the particular objects represented by the respective thumbnails are present.

More specifically, the digital camera 1 determines whether a particular object is included based on the angle of view calculated from the position information associated with the particular object, and the position information, the image capturing direction, and an image capturing parameter (a rate of zoom, or the like) of the digital camera 1. When the digital camera 1 determines that the particular object is not included in the angle of view visually recognized by the user, the digital camera 1 also determines in which direction the user should face in order to visually recognize the object, informs the user of the direction, and guides him/her therein.

As described above, in accordance with the present embodiment, a user can intuitively grasp a direction in which a particular object is present. The user can also adjust, by moving the digital camera 1 in the direction of which the digital camera 1 is informed, a displacement between the position of the particular object in the real space and the image capturing direction.

Such a guidance system is specifically described below with reference to a plurality of embodiments. Although the digital camera 1 is shown as a client terminal in each embodiment, the client terminal in accordance with the present embodiment is not limited thereto. For example, the client terminal may be a video camera, a smartphone with a camera, PDA (Personal Digital Assistants), a PC (a Personal Computer), a portable phone, a portable music player, a portable image processing apparatus, a portable game device, a telescope, binoculars or the like. In addition, the client terminal in accordance with the present embodiment is not limited to an apparatus with a camera. For example, the client terminal is also applicable to an apparatus capable of acquiring the position information and the direction information of the apparatus such as an apparatus with a GPS or a direction sensor.

2. Embodiments 2-1. First Embodiment

A guidance system in accordance with a first embodiment determines, in a digital camera 1, whether the angle of view visually recognized by a user includes a particular object. If a particular object is not included, the user is guided in a direction in which the user should face in order to visually recognize the particular object. The configuration, the guidance process, and the like of the digital camera 1 in accordance with such a first embodiment are sequentially described below.

(2-1-1. Configuration of Digital Camera)

Figure 2:
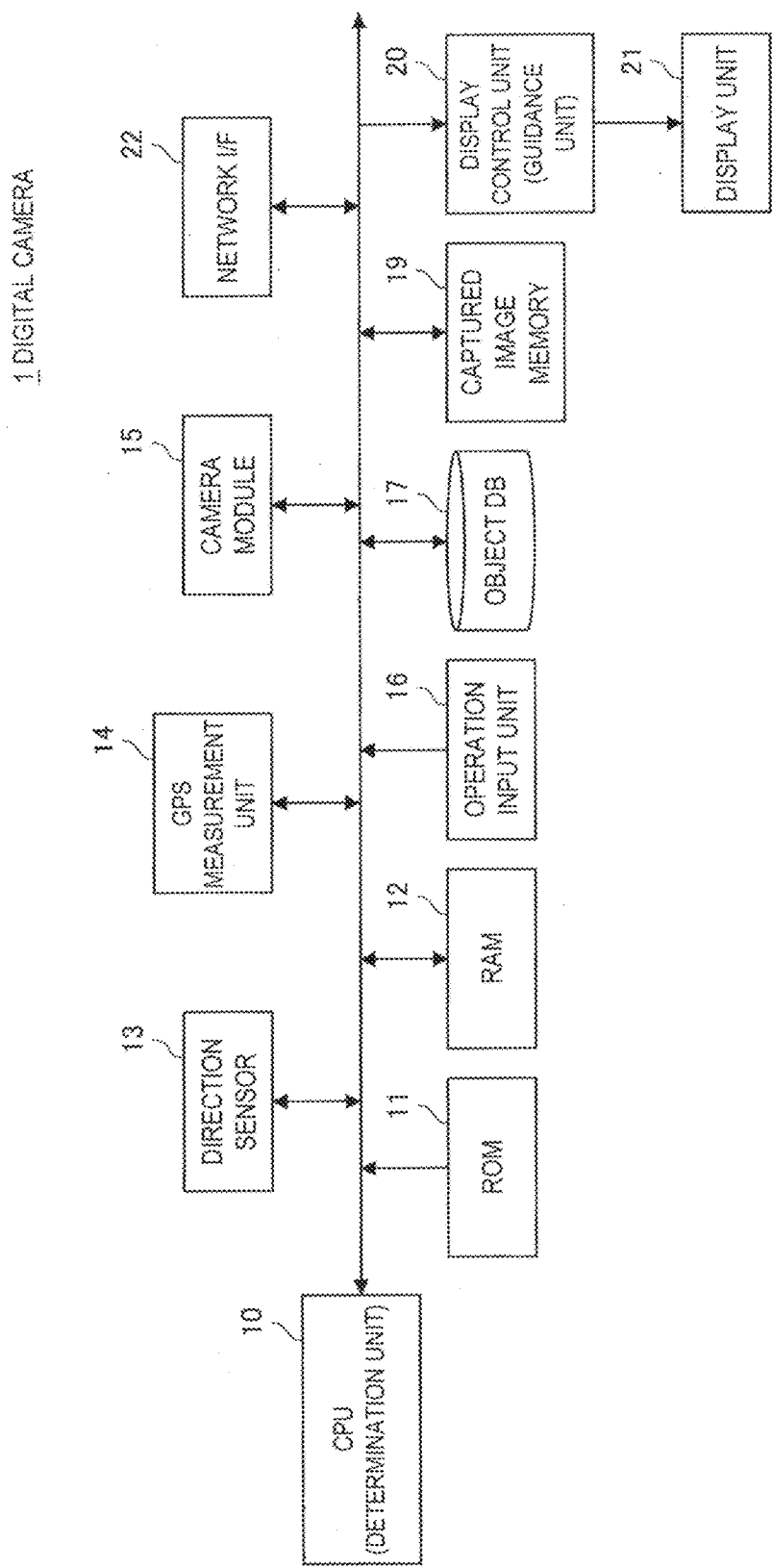
FIG. 2 is a block diagram illustrating the configuration of a digital camera in accordance with a first embodiment.

FIG. 2 is a block diagram illustrating the configuration of the digital camera 1 in accordance with the present embodiment. As illustrated in FIG. 2, the digital camera 1 has a CPU 10, ROM 11, RAM 12, a direction sensor 13, a GPS measurement unit 14, a camera module 15, an operation input unit 16, an object DB 17, a captured image memory 19, a display control unit 20, a display unit 21, and a network interface (I/F) 22. Each configuration is described below.

The direction sensor 13 detects the direction of the optical axis of lens optics of the camera module 15 (namely, the image capturing direction), and outputs the information on the detected image capturing direction (direction information). Additionally, the digital camera 1 having the camera module 15 is given as an example of the client terminal herein, but as discussed above, the client terminal in accordance with the present embodiment is not limited to a device having a camera. When the direction sensor 13 is a client terminal without a camera, a direction in which a given portion of the client terminal is facing may be output as direction information.

The GPS (Global Positioning System) measurement unit 14 receives radio waves from a GPS satellite, detects the position of the digital camera 1, and outputs the detected position information. The GPS measurement unit 14 is an example of a position information acquisition unit that detects the position of the digital camera 1 based on an externally acquired signal. The position information acquisition unit may detect the position through transmission to and receipt from WiFi, a portable phone, a PHS, a smartphone, or the like, or through near field communication or the like, for example.

The camera module 15 includes an image sensor, optics that include an imaging lens, and a captured image signal processing unit. The camera module 15 outputs data of the captured image as digital signals. Additionally, the image sensor is realized using a CCD (Charge Coupled Device) imager or a CMOS (Complementary Metal Oxide Semiconductor) imager, for example.

The operation input unit 16 is a group of physical keys such as a shutter button, a zoom dial and various types of switches for detecting various types of operations performed by a user, a touch panel stacked on the display unit 21 and the like. The CPU 10 executes a process in response to a user operation input from the operation input unit 16 in accordance with a program in the ROM 11.

The object DB 17 is a storage unit that stores an object including an artificial object and a natural object in association with the position information thereof. The object DB 17 may also store the object in association with classification information indicative of classification of the object as information regarding the object. In addition, the object DB 17 may store the object in association with a thumbnail, a letter, a figure, or the like indicative of the object as information regarding the object.

Here, FIG. 3 illustrates an example of data stored in the object DB 17. As illustrated in FIG. 3, position information (for example, latitude and longitude) P-1 to P-4, and classification information are associated with the respective objects.

As illustrated in FIG. 3, for example, the position information P-1 indicative of the position of "A gate" and the classification information indicative of classification "gate" are associated with "A gate." In addition, as illustrated in FIG. 3, the position information P-2 and the classification information indicative of classification "building" are associated with "B building." The position information P-3 and the classification information indicative of classification "hotel" are associated with "C hotel." The position information P-4 and the classification information indicative of classification "tower" are associated with "D tower."

Flash memory such as card type memory is used as the captured image memory 19, for example. The captured image memory 19 may also be a recording medium like a DVD (Digital Versatile Disc) or the like. Further, the captured image memory 19 need not be such a removal memory medium, but may be a hard disk device.

The captured image memory 19 may store, as captured images, images of a subject, which have been sequentially output from the camera module 15, in accordance with the operation timing of a shutter button.

The CPU 10 controls each configuration of the digital camera 1. The CPU 10 in accordance with the present embodiment also has a function of a determination unit that determines, based on position information associated with a particular object, whether the particular object is included in the angle of view visually recognized by a user. Specifically, for example, the CPU 10 determines whether a particular object is included based on the angle of view calculated from the position information output from the GPS measurement unit 14, the image capturing direction output from the direction sensor 13, and the image capturing parameter (a rate of zoom or the like) output from the camera module 15.

When the CPU 10 determines that a particular object is not included in the angle of view visually recognized by the user, the CPU 10 can also determine in which direction the user should face in order to visually recognize the particular object. In the present embodiment, a direction in which the user should face in order to visually recognize a particular object is a direction in which the particular object, which is determined based on the position information and the image capturing direction of the digital camera 1, and the position information associated with the particular object, is present. The CPU 10 outputs the thus determined direction in which the particular object is present to the display control unit 20, which in turn informs the user of the direction, thereby guiding the user.

The CPU 10 in accordance with the present embodiment also has a function of a calculation unit that calculates a displacement degree (a difference) between the direction in which the particular object is present and the image capturing direction of the digital camera 1. The CPU 10 outputs the calculated displacement degree to the display control unit 20. The display control unit 20 uses the displacement degree when guiding the user.

Figure 4:
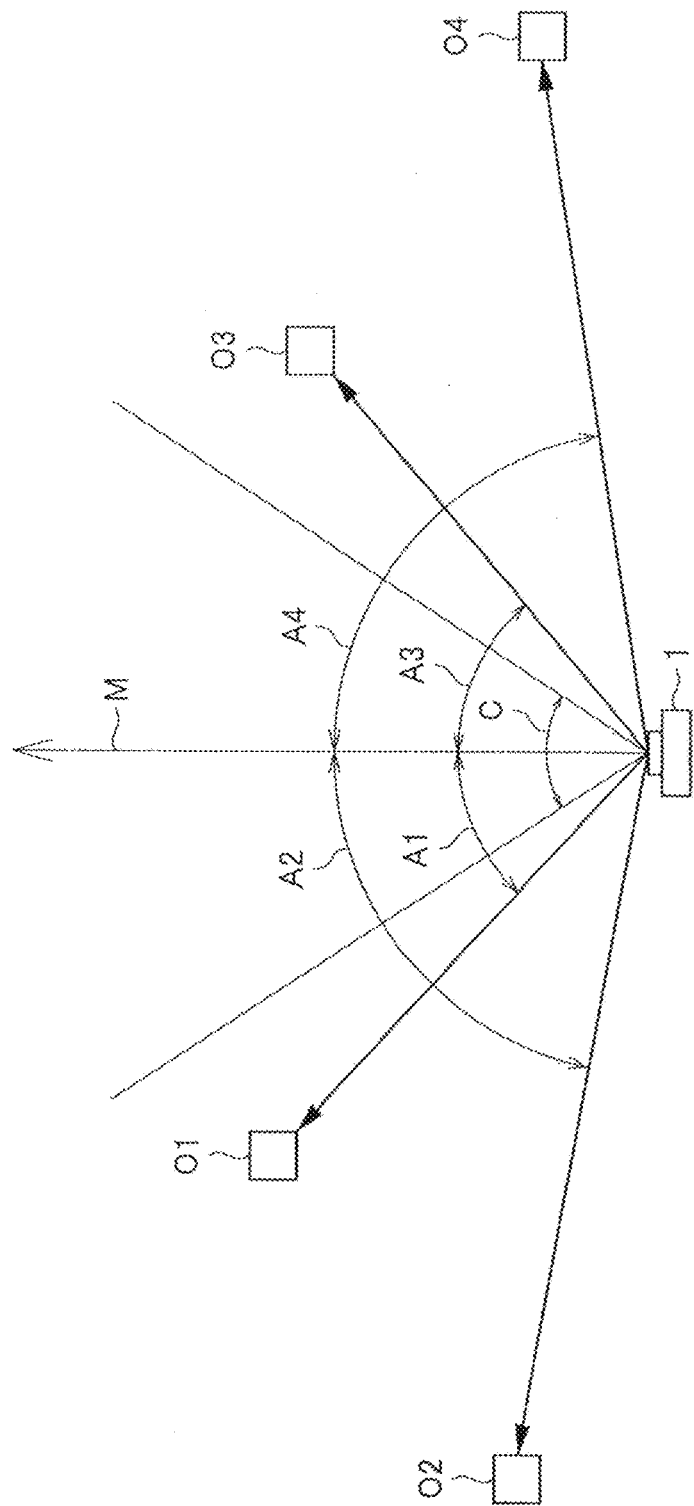
FIG. 4 is a diagram illustrating a position relationship between the angle of view of the digital camera and each object in accordance with the first embodiment.

The calculation of the displacement degree by the CPU 10 will be described in detail with reference to FIG. 4. FIG. 4 is a diagram illustrating a position relationship between the angle of view of the digital camera 1 and each object. For example, as illustrated in FIG. 4, the CPU 10 recognizes the arrangement of particular objects O1 to O4 based on position information associated with each object stored in the object DB 17, and the position information and the image capturing direction of the digital camera 1. Then, when the calculated angle of view C is a range as illustrated in FIG. 4, the CPU 10 can determine that the particular objects O1 to O4 are not included in the angle of view C.

Further, the CPU 10 calculates a difference (an angle A) between the direction in which each of the particular objects O1 to O4 is present and the image capturing direction M as a displacement degree. For example, as illustrated in FIG. 4, the direction in which the object O1 is present and the image capturing direction M are displaced by A1 degrees. In addition, illustrated in FIG. 4, the direction in which the object O2 is present and the image capturing direction M are displaced by A2 degrees, the direction in which the object O3 is present and the image capturing direction M are displaced by A3 degrees, and the direction in which the object O4 is present and the image capturing direction M are displaced by A4 degrees.

Although, in the present embodiment, as an example of a method of calculating a displacement degree of a direction in which a particular object is present (a direction in which a user should face or a guidance direction), a difference between the image capturing direction M (the center of the angle of view C) and the direction in which the particular object is present is calculated, the present embodiment is not limited thereto. For example, the CPU 10 may calculate, as a displacement degree, a difference between the border of the angle of view C and the direction in which the particular object is present.

Additionally, although, in the present embodiment, the CPU 10 extracts position information associated with a particular object from the object DB 17, a source from which the position information is acquired in accordance with the embodiment of the disclosure is not limited thereto. For example, the CPU 10 may extract position information associated with a particular object from a particular server or an indefinite number of servers on a network via the network I/F 22.

In addition to a program for executing an image capturing function, the ROM 11 stores programs or the like for performing a process of recognizing a position indicated by a user, and a process of determining whether a particular object is included within the angle of view visually recognized by the user. The programs stored in the ROM 11 are also executed by the CPU 10 using the RAM 12 as a work area.

The display control unit 20 performs display control on display content of a display screen displayed in the display unit 21 under control of the CPU 10 based on the program in the ROM 11. The display control unit 20 in accordance with the present embodiment also has a function of a guidance unit that provides information on a direction in which a user should face (a direction in which a particular object is present), which is output from the CPU 10, and guides the user. Further, the display control unit 20 can guide the user in a more detailed way based on a displacement degree output from the CPU 10.

The display unit 21 displays an image of a subject output from the camera module 15 in addition to a menu screen, various types of operation screens or the like in real time, and a captured image stored in the captured image memory 19 in accordance with control of the display control unit 20. The display unit 21 is realized using a LCD (Liquid Crystal Display), an OLED (Organic Light-Emitting Diode) or the like, for example.

The display unit 21 in accordance with the present embodiment also displays, under control of the display control unit 20 (the guidance unit), a guidance screen for guiding the user to face in a direction in which he/she should face in order to visually recognize a particular object. The guidance screen displayed by the display unit 21 in accordance with the present embodiment will be described in detail in "2-1-3. Examples of guidance screen" below.

Although the display control unit 20 controls display of the display unit 21 included in the digital camera 1 in the present embodiment, a device controlled in accordance with the present embodiment is not limited to the display unit 21. For example, the display control unit 20 may control display of an external display device connected to the digital camera 1.

The network I/F 22 is a communication module for transmitting data to and receiving data from an external device. For example, the network I/F 22 in accordance with the present embodiment may acquire position information associated with a particular object from the network.

The configuration of the digital camera 1 in accordance with the first embodiment has been described in detail above. Next, a guidance process in accordance with the present embodiment will be described with reference to FIG. 5.

(2-1-2. Guidance Process)

Figure 5:
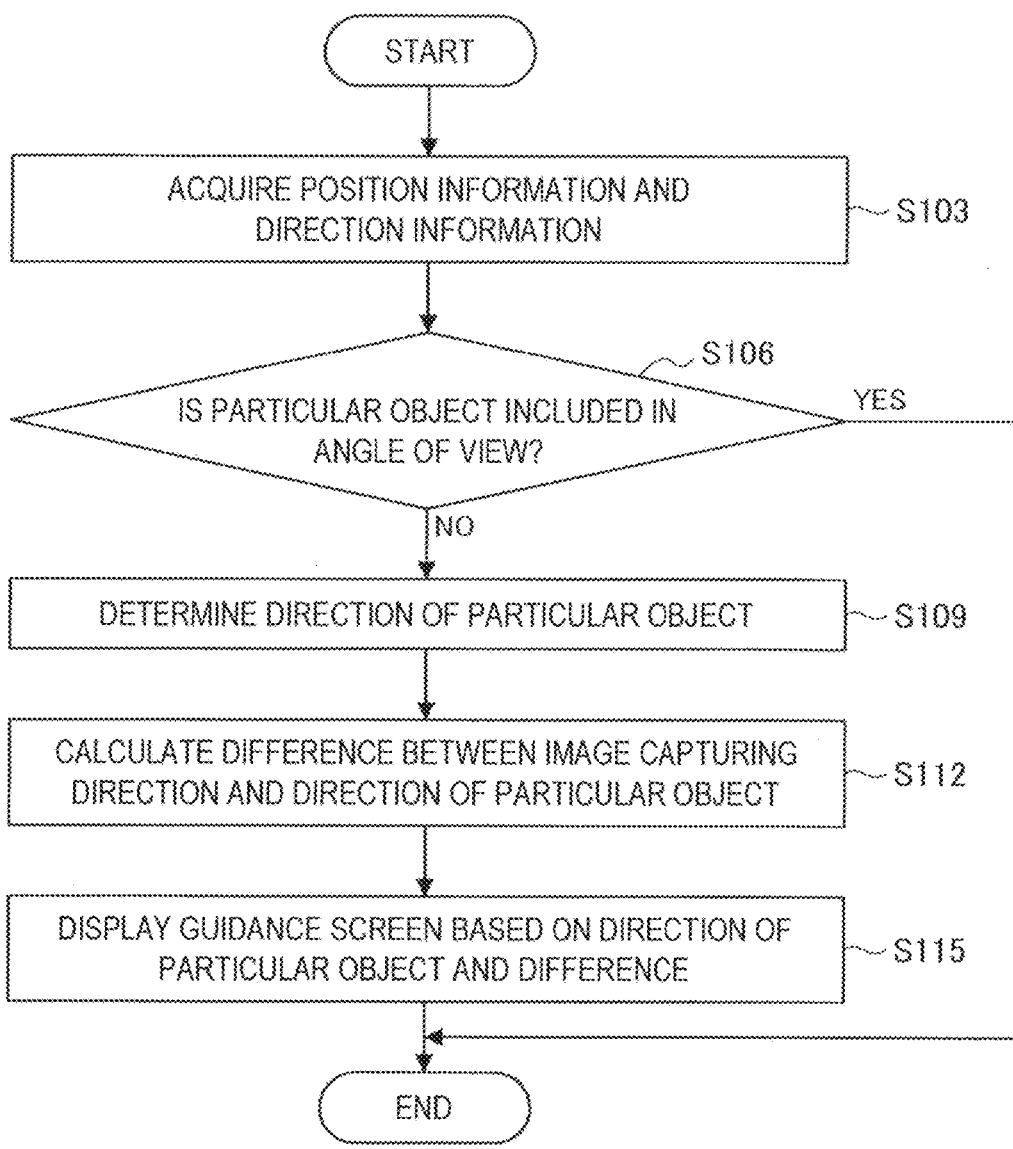
FIG. 5 is a flowchart illustrating a guidance process in accordance with the first embodiment.

FIG. 5 is a flowchart illustrating the guidance process in accordance with the present embodiment. As illustrated in FIG. 5, first, in step S103, the CPU 10 acquires position information of the device (the digital camera 1) from the GPS measurement unit 14, and acquires the image capturing direction from the direction sensor 13.

Next, in step S106, the CPU 10 determines whether a particular object is included in the angle of view visually recognized by a user. As discussed above, the CPU 10 determines whether the particular object is included, based on, for example, the angle of view calculated from the position information, the image capturing direction of the digital camera 1, and an image capturing parameter output from the camera module 15.

Next, in step S109, when it is determined in step S106 that the particular object is not included in the angle of view, the CPU 10 determines a direction (a direction in which the particular object is present) in which the user should face in order to visually recognize the particular object.

In addition, in step S112, the CPU 10 calculates a difference (a displacement degree) between the image capturing direction and the direction in which the particular object is present.

Next, in step S115, the display control unit 20 performs display control on a guidance screen based on the direction in which the particular object is present and the difference.

The basic guidance process in accordance with the present embodiment has been described in detail above. Next, the guidance screen displayed in step S115 will be described in detail.

(2-1-3. Examples of Guidance Screen)

The display control unit 20 may guide a user by superimposing and displaying a thumbnail, a letter, a figure, or the like indicative of a particular object on an end of the screen, which corresponds to a direction (a guidance direction) in accordance with a direction in which the particular object is present, on the screen on which a captured image (also referred to as a real image, hereinafter) obtained by capturing real space is displayed. Examples of guidance images superimposed and displayed on the real image for guiding the user in such a manner will be provided below, for example.

Thumbnail Display

First, a case where a guidance image is a thumbnail of a particular object will be described with reference to FIG. 1. As illustrated in FIG. 1, the display control unit 20 superimposes and displays thumbnails S1 and S2 of particular objects present in the left direction on the left end of the real image 210. The display control unit 20 also superimposes and displays thumbnails S3 and S4 of particular objects present in the right direction on the right end of the real image 210.

The display control unit 20 may also control the size of the thumbnail of a particular object in accordance with a displacement degree of the direction in which the particular object is present.

For example, when "A gate" represented by the thumbnail S1 has a smaller displacement degree than "B building" represented by the thumbnail S2, the display control unit 20 controls display such that the thumbnail S1 is larger than the thumbnail S2, as illustrated in FIG. 1.

Therefore, a user can intuitively understand that "A gate" represented by the thumbnail S1 is included in the angle of view if the digital camera 1 is tilted a little to the left, and "B building" represented by the thumbnail S2 is included in the angle of view if the digital camera 1 is further tilted to the left.

Similar operations can also be performed on the thumbnails S3 and S4 displayed on the right end. When "C hotel" represented by the thumbnail S3 has a smaller displacement degree than "D tower" represented by the thumbnail S4, the display control unit 20 controls display such that the thumbnail S3 is larger than the thumbnail S4.

Therefore, the user can intuitively understand that "C hotel" represented by the thumbnail S3 is included in the angle of view if the digital camera 1 is tilted a little to the right, and "D tower" represented by the thumbnail S4 is included in the angle of view if the digital camera 1 is further tilted to the right.

Thumbnail Display and Arrow Display

Next, a case where a guidance image is a thumbnail and an arrow of a particular object will be described with reference to a display example 40 illustrated in FIG. 6. The display example 40 illustrated in FIG. 6 is similar to the above-described example illustrated in FIG. 1 in that a thumbnail of a particular object is displayed on an end of the screen corresponding to the direction in which the particular object is present. Although the size of the thumbnail is controlled in accordance with a displacement degree of the direction in which the particular object is present in the example illustrated in FIG. 1, the size, length, line weight, or the like of the arrow displayed along with the thumbnail is controlled in accordance with the displacement degree in the display example 40 illustrated in FIG. 6.

For example, when "A gate" represented by the thumbnail S1 has a smaller displacement degree than "B building" represented by the thumbnail S2, the arrow A1 displayed with the thumbnail S1 is larger, shorter, and wider in width than the arrow A2 displayed with the thumbnail S2.

Therefore, the user can intuitively understand to what degree the orientation of the digital camera 1 should be displaced in order to include a particular object in the angle of view.

Additionally, similar operations can be performed on the thumbnail S3 and the arrow A3, and the thumbnail S4 and the arrow A4 displayed on the right end.

Partial Display of Thumbnail

Although the entire range of a thumbnail indicative of a particular object is superimposed and displayed in the above-described example, a display example of the guidance image in accordance with the embodiment of the present disclosure is not limited thereto. For example, a display proportion of a thumbnail may be controlled in accordance with a displacement degree.

For example, as illustrated in a display example 42 of FIG. 6, when "A gate" represented by the thumbnail S1 has a smaller displacement degree than "B building" represented by the thumbnail S2, the display control unit 20 may increase a display proportion of the thumbnail S1 more than that of the thumbnail S2.

Therefore, the user can intuitively understand to what degree the orientation of the digital camera 1 should be displaced in order to include a particular object in the angle of view.

Separation of Guidance Screen

Although the guidance image is superimposed and displayed on the real image in each of the above-described examples, a guidance method in accordance with the embodiment of the present disclosure is not limited thereto. For example, a display screen of a real image and a guidance screen displaying a guidance image may be separated.

Figure 7:
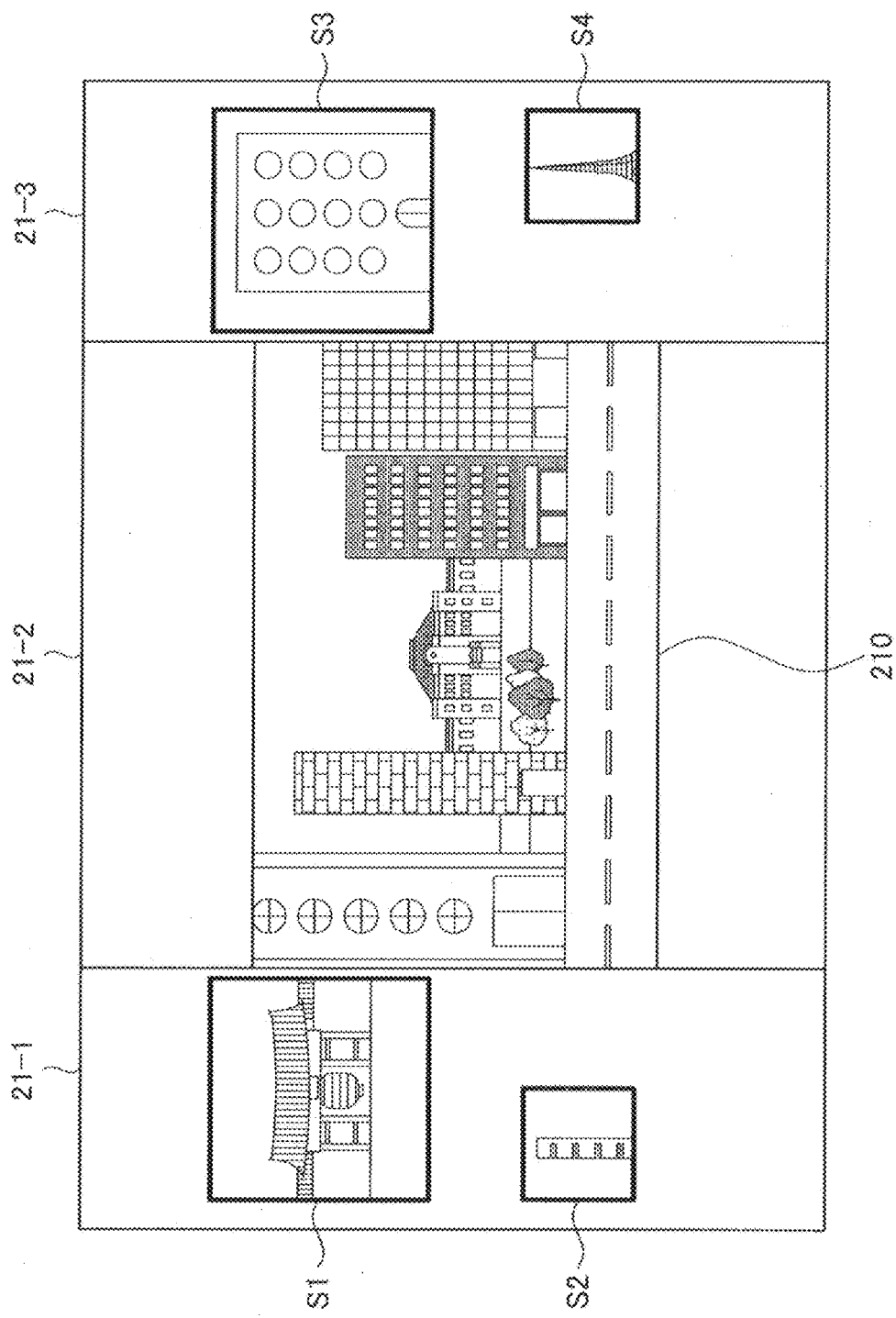
FIG. 7 is a diagram illustrating another example of the guidance screen in accordance with the first embodiment.

FIG. 7 illustrates an example in the case where a display screen 21-2 of a real image, and display screens 21-1 and 21-3 of guidance images are separated in the display screen of the display unit 21. As illustrated in FIG. 7, the display control unit 20 displays thumbnails S1 and S2 of particular objects present in the left direction on the guidance screen 21-1 which is on the left end of the display screen. Meanwhile, the display control unit 20 displays thumbnails S3 and S4 of particular objects present in the right direction on the guidance screen 21-3 which is on the right end of the display screen.

As described above, the guidance image is prevented from being overlaid on the real image 210 so that a user can intuitively grasp the direction in which a particular object is present, visually recognizing all subjects shown in the real image 210.

Display Control in Accordance with Displacement Degree

Although each of the above-described examples has described a case where the size of a thumbnail of a particular object, and the size, length and line weight of an arrow are controlled in accordance with a displacement degree, display control of a guidance image in accordance with a displacement degree in accordance with the embodiment of the present disclosure is not limited thereto.

Figure 8:
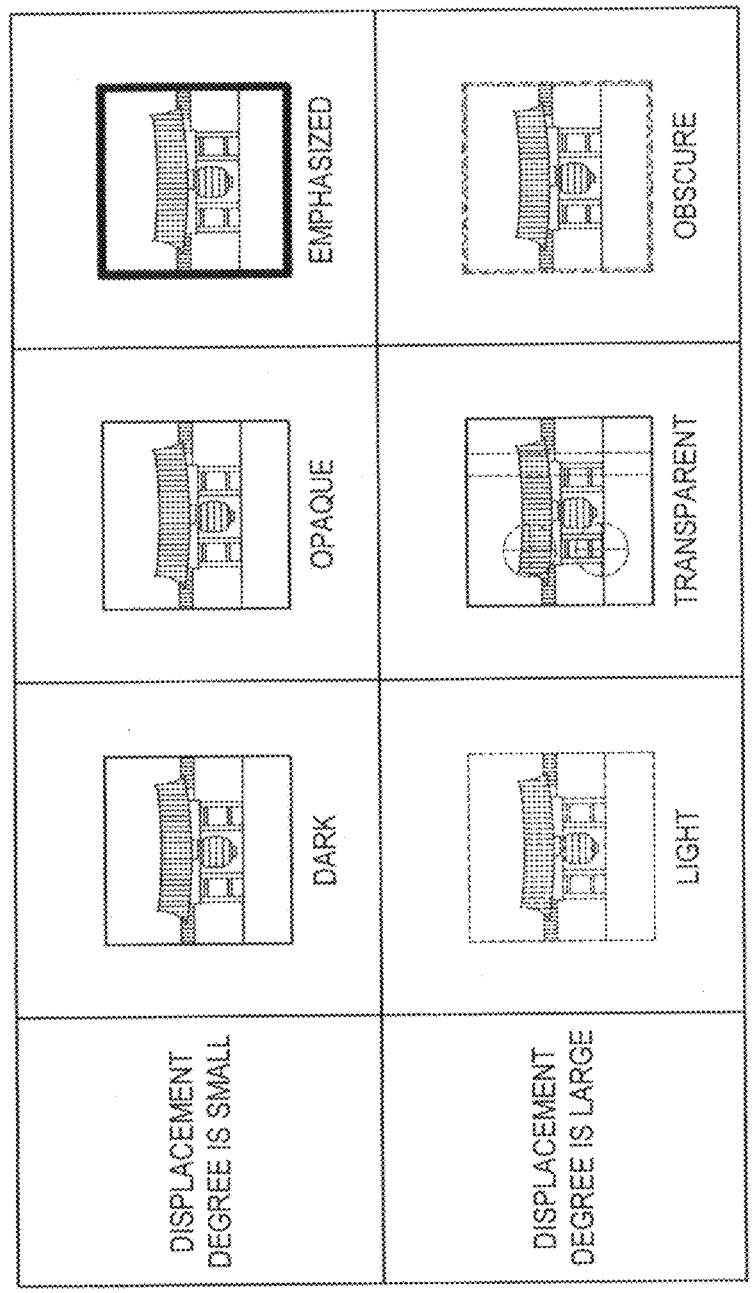
FIG. 8 is a diagram illustrating a list of display examples of guidance images in accordance with the size of a displacement degree in accordance with the first embodiment.

For example, the display control unit 20 in accordance with the present embodiment may control gradation and transmittance, emphasis and shades of the outline in respect of an image for guidance such as a thumbnail, an arrow or the like, in accordance with a displacement degree. FIG. 8 illustrates a list of display examples of guidance images in accordance with a displacement degree.

As illustrated in the upper row of FIG. 8, the display control unit 20 may perform display control on a thumbnail such that the thumbnail becomes darker, transmittance becomes lower, or more emphasis is put on the outline as the displacement degree is smaller. In such a case, as illustrated in the lower row of FIG. 8, the display control unit 20 performs display control on the thumbnail such that the thumbnail becomes lighter, the transmittance becomes higher, or the outline becomes more obscure as the displacement degree is larger.

Screen Transition in Response to Change of Image Capturing Direction

The digital camera 1 in accordance with the above-described present embodiment changes a guidance image by repeating the flow illustrated in FIG. 5 each time the position information and the image capturing direction of the digital camera 1 change. Display control of a guidance image in the case where the image capturing direction changes will be described with reference to FIG. 9 below.

FIG. 9 is a diagram of screen transition in response to a change of the image capturing direction in accordance with the present embodiment. As illustrated in the upper view of FIG. 9, thumbnails S1 to S4 of particular objects are first superimposed and displayed on the real image 210-1 in accordance with the directions in which the particular objects are present and the displacement degrees.

A user can intuitively grasp in which direction and to what degree the particular objects are displaced from the real image, based on the display positions or the sizes of the thumbnails S1 to S4 of the particular objects. For example, when the user hopes to capture an image of "C hotel" represented by the thumbnail S3 superimposed and displayed on the right end of the real image 210-1, the user directs the body of the digital camera 1 in the right direction such that the thumbnail S3 is displayed at the center of the real image.

Once the orientation (the image capturing direction) of the body of the digital camera 1 changes, the direction in which "C hotel" is present, or a displacement degree between the image capturing direction and the direction in which "C hotel" is present also changes. Accordingly, the display control unit 20 moves the display position of the thumbnail S3 in accordance with these changes, as illustrated in the lower view of FIG. 9. Even when "C hotel" is included in the angle of view and shown in the real image, the display control unit 20 may also keep moving the display position in accordance with the displacement degree from the image capturing direction (see the image capturing direction M illustrated in FIG. 4).

Then, "C hotel" represented by the thumbnail S3 can be shown at the center of the real image 210-2 by adjusting the orientation of the body of the digital camera 1 such that the thumbnail S3 moves to the center of the real image 210-2. As described above, the user can, by changing the orientation of the body of the digital camera 1 based on the guidance image, correct a displacement between the position (the real position) of the particular object in the real space and the image capturing direction.

Guidance of Object Hidden Behind Subject

Next, guidance will be described in the case where a particular object is not shown in a real image since the particular object is hidden behind another object (a subject).

Regarding the method of determining whether a particular object is included in the angle of view, which has been described above with reference to FIG. 4, the CPU 10 determines that an object outside the angle of view C is not included in the angle of view. However, a determination method in accordance with the embodiment of the present disclosure is not limited thereto. For example, the CPU 10 in accordance with the present embodiment may determine that an object not shown in the real image is not included in the angle of view (the field of view) visually recognized by the user, even if the object is inside the angle of view C.

Figure 10:
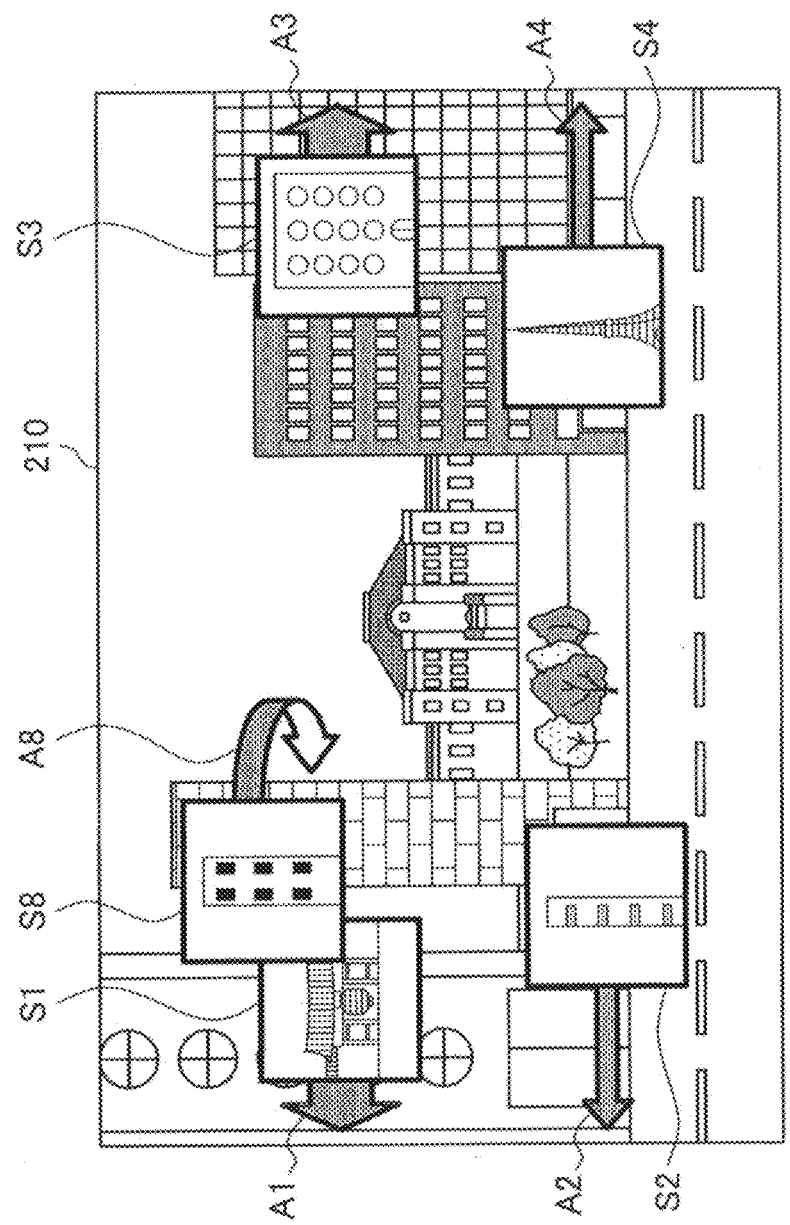
FIG. 10 is a diagram illustrating an example of the guidance screen in the case where an object not shown in a real image is guided in accordance with the first embodiment.

An example of a guidance screen will be described with reference to FIG. 10 in the case where an object not shown in the real image is guided in such a manner. In the example illustrated in FIG. 10, a particular object represented by a thumbnail 8 is not shown in the real image since the particular object is hidden behind another object. Thus, as illustrated in FIG. 10, the display control unit 20 may display an arrow A8 with the thumbnail S8 for guiding the user to the rear of the other object, for example.

This enables the user to intuitively understand that the user can, by moving to the rear of the other object, capture an image of the particular object.

Display of Guidance Image that is Filtered

Here, the CPU 10 in accordance with the present embodiment may determine in which direction where a particular object is present a user should be guided, by performing filtering based on the classification information or other related information (is it a famous spot ?, or the like) associated with the object.

For example, the digital camera 1 may preferentially guide a user to a famous spot, a famous building, or the like, or may preferentially guide the user to an object (for example, an object with which classification information "building" is associated) that has been searched for based on a search key indicated by the user.

The digital camera 1 may also preferentially guide the user to an object that matches the user's preference by collecting statistics of the user's operation history. The user's operation history may be, for example, a history indicating which object has been zoomed on by the user, which object has come into focus, or which object has been captured.

For example, when a user has captured an image of a particular object, the digital camera 1 may guide the user in a direction in which another object associated with the same classification information (for example, "classification information: tower") as that of the other object is present.

Further, the digital camera 1 in accordance with the present embodiment may make, of the displayed guidance images, a guidance image for guiding the user to a famous spot, a famous building, or the like more noticeable than the other guidance images by changing the color of the guidance image or flashing the guidance image.

The first embodiment has been described in detail above. In accordance with the present embodiment, the digital camera 1 determines whether a particular object is included in the angle of view visually recognized by a user. When a particular object is not included, the digital camera 1 determines a direction in which the user should face in order to visually recognize the particular object, informs the user of the direction, and guides the user in the direction.

Therefore, the user can intuitively grasp the direction in which the particular object is present, and direct the digital camera 1 toward the particular object.

2-2. Second Embodiment

In the above-described first embodiment, the digital camera 1 determines whether a particular object is included in the angle of view visually recognized by the user. However, it is not limited to the digital camera 1 side to perform such determination. A server side may perform such determination, for example. A second embodiment in which the sever side determines whether a particular object is included in the angle of view visually recognized by the digital camera 1 will be described in detail with reference to FIGS. 11 and 12 below.

(2-2-1. System Configuration)

Figure 11:
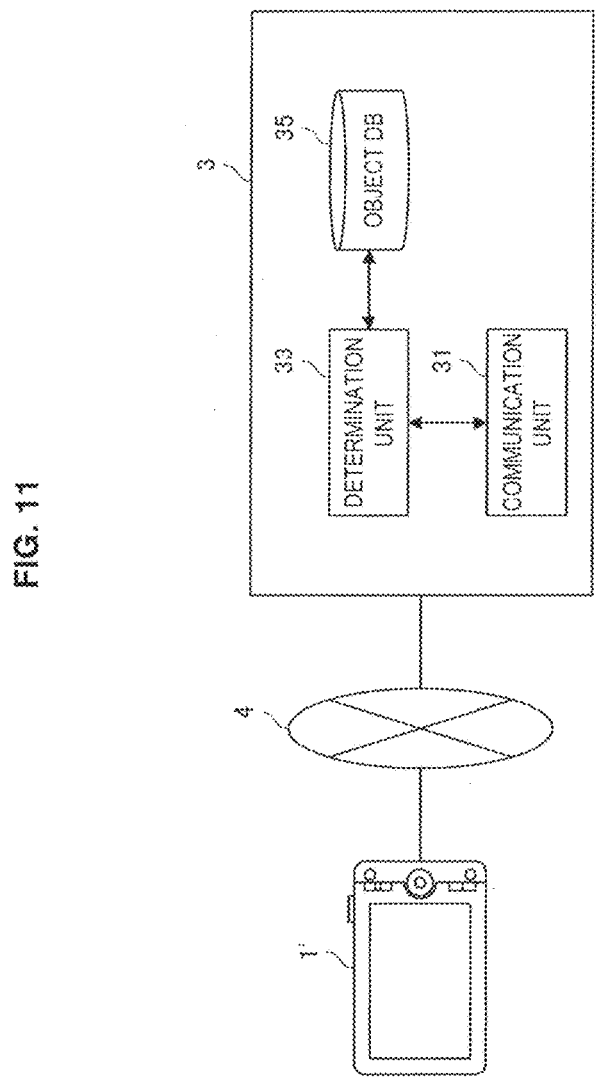
FIG. 11 is a diagram describing the overall configuration of a guidance system in accordance with a second embodiment.

FIG. 11 is a diagram illustrating the overall configuration of a guidance system in accordance with the second embodiment. As illustrated in FIG. 11, the guidance system in accordance with the present embodiment includes a digital camera 1' and a server 3. In addition, the digital camera 1' and the server 3 are connected to each other via a network 4.

The configuration of the digital camera 1' in accordance with the present embodiment need not have the object DB 17 of the configuration illustrated in FIG. 2. In addition, the CPU 10 need not have a function of a determination unit. In the present embodiment, the server 3 has an object DB and a determination unit, as described below.

As illustrated in FIG. 11, the server 3 in accordance with the present embodiment has a communication unit 31, a determination unit 33, and an object DB 35. The communication unit 31 is connected to the digital camera 1' via the network 4, and transmits and receives data. Specifically, for example, the communication unit 31 receives, from the digital camera 1', visual recognition information for estimating an angle of view visually recognized by a user.

The communication unit 31 also transmits, to the digital camera 1', guidance information for guiding the user in a direction in which the user should face in order to visually recognize a particular object not included in the angle of view visually recognized by the user.

The determination unit 33 has a function similar to the function of the determination unit included in the CPU 10 of the digital camera 1 in accordance with the above-described first embodiment. Specifically, the determination unit 33 determines whether a particular object is included in the angle of view visually recognized by the user. When determining that a particular object is not included in the angle of view, the determination unit 33 also determines a direction in which the user should face in order to visually recognize the particular object (namely, a direction in which the particular object is present), and outputs the determined direction to the communication unit 31.

Further, when also receiving the image capturing direction of the digital camera 1', the determination unit 33 calculates a displacement degree between the image capturing direction and the direction in which the particular object is present, and outputs the calculated displacement degree to the communication unit 31.

Similarly to the object DB 17 of the digital camera 1 in accordance with the above-described first embodiment, the object DB 35 is a storage unit for storing an object including an artificial object and a natural object in association with its position information (see FIG. 3). Similarly to the above-described object DB 17, the object DB 35 may also store the object in association with classification information indicative of classification of the object, or a thumbnail, a letter, a figure or the like indicative of the object.

The system configuration of the guidance system in accordance with the second embodiment has been described above. Next, a guidance process in accordance with the present embodiment will be described with reference to FIG. 12.

(2-2-2. Guidance Process)

Figure 12:
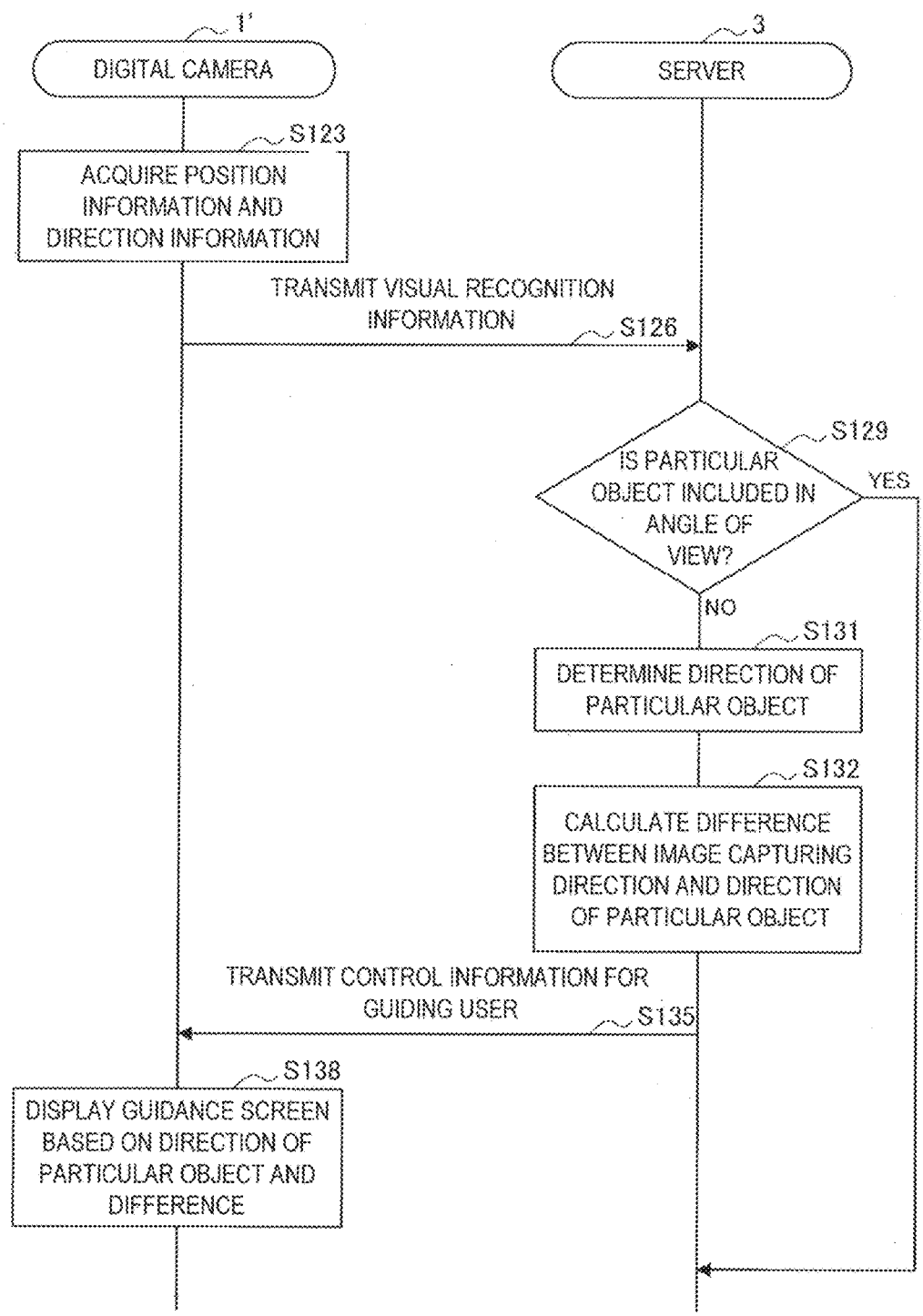
FIG. 12 is a flowchart illustrating a guidance process in accordance with the second embodiment.

FIG. 12 is a flowchart illustrating the guidance process in accordance with the present embodiment. As illustrated in FIG. 12, first, in step S123, the digital camera 1' acquires position information of the device by using the GPS measurement unit 14, and also acquires then image capturing direction by the direction sensor 13.

Next, in step S126, the digital camera 1' transmits, to the server 3, the visual recognition information for estimating (calculating) the angle of view visually recognized by the user. Herein, the visual recognition information to be transmitted to the server 3 may be an image capturing parameter output from the camera module 15. The digital camera 1' may also include the position information and the image capturing direction acquired in step S123 in the visual recognition information to be transmitted.

In addition, in step S129, the determination unit 33 of the server 3 determines whether a particular object is included in the angle of view visually recognized by the user that is estimated based on the visual recognition information that the communication unit 31 has received from the digital camera 1'. The determination unit 33 may also determine whether a particular object is included in the captured image. For example, the determination unit 33 may determine whether a particular object is included based on the position information, the image capturing direction, and the estimated angle of view of the digital camera 1'. The determination unit 33 also may determine whether a particular object is included by performing patter recognition on the captured image.

Next, when it is determined in step S129 that a particular object is not included in the angle of view, the determination unit 33 determines, in step S131, a direction in which the user should face (a direction in which the particular object is present) in order to visually recognize the particular object.

In addition, in step S132, the determination unit 33 calculates a difference (a displacement degree) between the image capturing direction of the digital camera 1' and the direction in which the particular object is present.

Next, in step S135, the server 3 transmits, to the digital camera 1', control information for guiding the user in the direction in which the particular object is present. Herein, the control information to be transmitted to the digital camera 1' includes, for example, the direction in which the particular object is present, the displacement degree (the difference) between the direction in which the particular object is present and the image capturing direction, and a guidance image (a thumbnail or the like of the object stored in the object DB 35).

Then, in step S138, the digital camera 1' performs display control on the guidance screen based on the direction in which the particular object is present and the difference included in the control information received from the server 3.

The system configuration and the guidance process in accordance with the second embodiment have been described in detail above. In accordance with the present embodiment, the server 3 determines whether a particular object is included in the angle of view visually recognized by the user. If a particular object is not included, the server 3 determines the direction in which the user should face in order to visually recognize the particular object and transmits the direction to the digital camera 1'. Then, the digital camera 1' is informed of the direction so that the user can be guided.

2-3. Third Embodiment

In each of the above-described embodiments, the digital cameras 1 and 1' are given as examples of a client terminal and a guidance screen is displayed on the display unit 21 so that a user is informed of a direction in which a particular object is present. However, a guidance system in accordance with the embodiment of the present disclosure is not limited thereto. For example, the guidance system in accordance with the embodiment of the present disclosure can be applied to a navigation system for a vehicle or a bicycle.

For example, when a guidance image is superimposed and displayed on scenery (corresponding to the real images described in the first and second embodiments) in the front viewed from a front glass of a vehicle, a user can be informed of a direction of a particular object that is not included in the angle of view visually recognized by the user, and thus guided.

Figure 13:
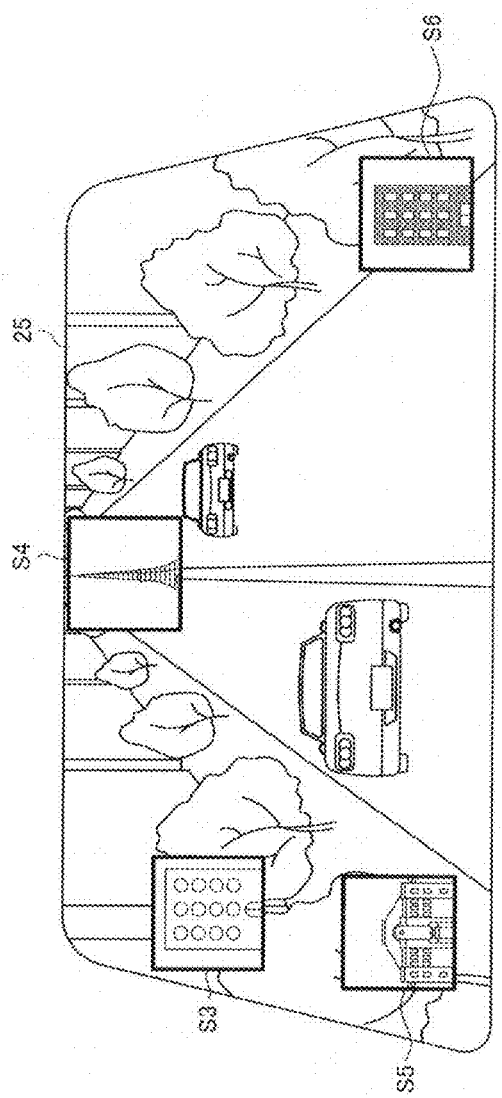
FIG. 13 is a diagram illustrating a display example of an image for guiding a user to the front glass of a vehicle in accordance with a third embodiment.

Various techniques for superimposing and displaying a guidance image on scenery in the front are conceivable. For example, as illustrated in FIG. 13, a client terminal in accordance with the present embodiment may display the thumbnails S3 to S6 on ends of a front glass 25 corresponding to directions in which the respective objects are present.

In such a case, a method of displaying the thumbnails on the front glass 25 may, for example, be a method of projecting the guidance images (the thumbnails S3 to S6) on the front glass 25 using a projector (not shown). The method may also be a method of realizing the front glass 25 by using a display device having transmittance and displaying the guidance images with the display device.

In the present embodiment, scenery in the front viewed from the front glass is captured by a camera mounted on a vehicle, and a screen obtained by superimposing and displaying a guidance image on the captured image (the real image) may be displayed on a navigation device.

2-4. Fourth Embodiment

Further, although, in each of the above-described embodiments, the direction in which the user should face is noticed by display control to guide the user, the guidance method in accordance with the embodiment of the present disclosure is not limited thereto. For example, a direction in which a user should face may be noticed by audio control. Alternatively, other than the above notice, the user may also be physically pressurized or vibrated, or may have electric current flow through his/her body to be guided.

Hereinafter, a guidance device (a client terminal) that flows electric current through a user's body to guide the user will be described in detail with reference to FIGS. 14 and 15.

Figure 14:
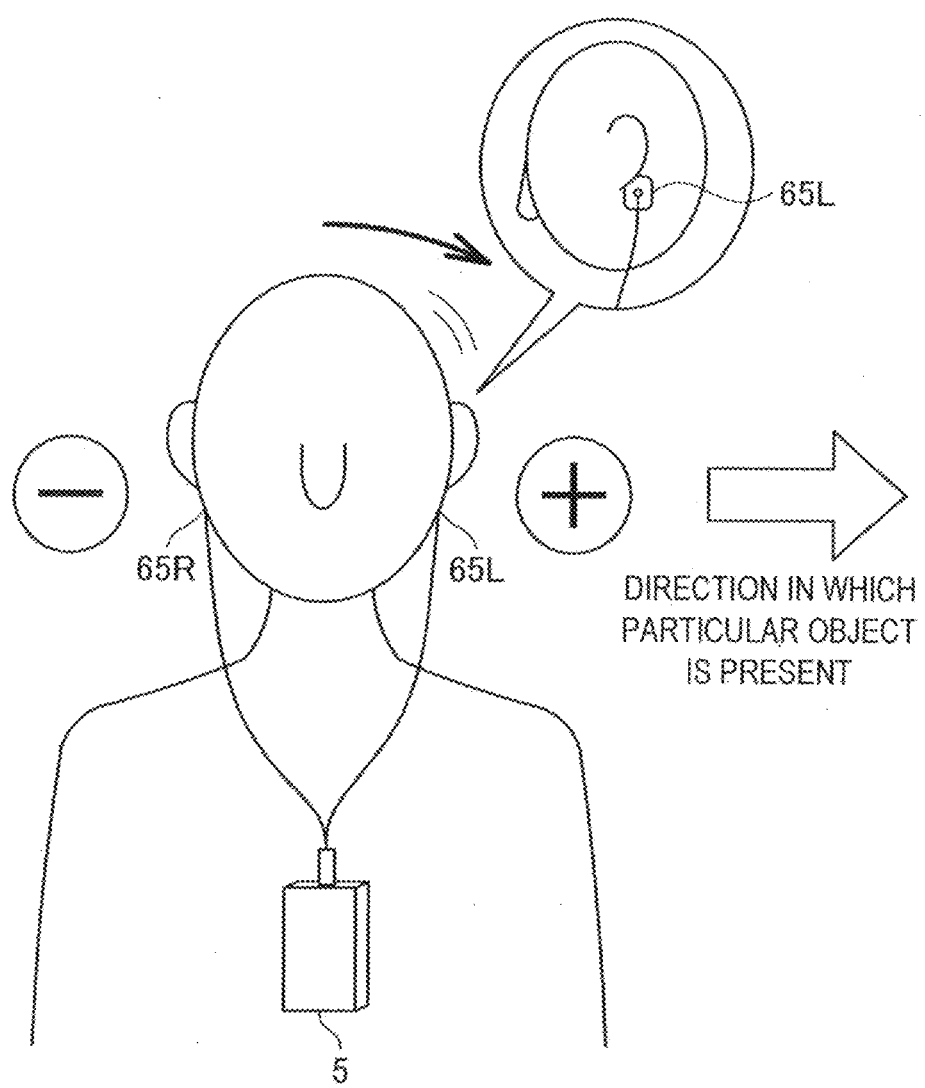
FIG. 14 is a diagram describing a guidance method for guiding a user by directly flowing electric current through the body of the user in accordance with a fourth embodiment.

FIG. 14 is a diagram illustrating a guidance method for guiding a user by flowing electric current directly through the body of the user. As illustrated in FIG. 14, a guidance device 5 in accordance with the present embodiment has a pair of electrodes 65R and 65L that are attached behind the user's ears. Electric current is flowed from the electrodes 65R and 65L to the body to guide the user.

More specifically, the guidance device 5 flows predetermined electric current to the electrodes 65R and 65L in accordance with a direction in which a particular object is present, and generates acceleration sensitivity without physical acceleration by providing the vestibular organs of the user with an electric stimulus via the electrodes. Since the body of the user leans in one direction in accordance with a flow of the electric current, he/she can intuitively understand the direction in which a particular object is present.

Next, the configuration of the guidance device 5 in accordance with the present embodiment will be described with reference to FIG. 15. FIG. 15 is a block diagram illustrating the configuration of the guidance device 5 in accordance with the fourth embodiment.

Figure 15:
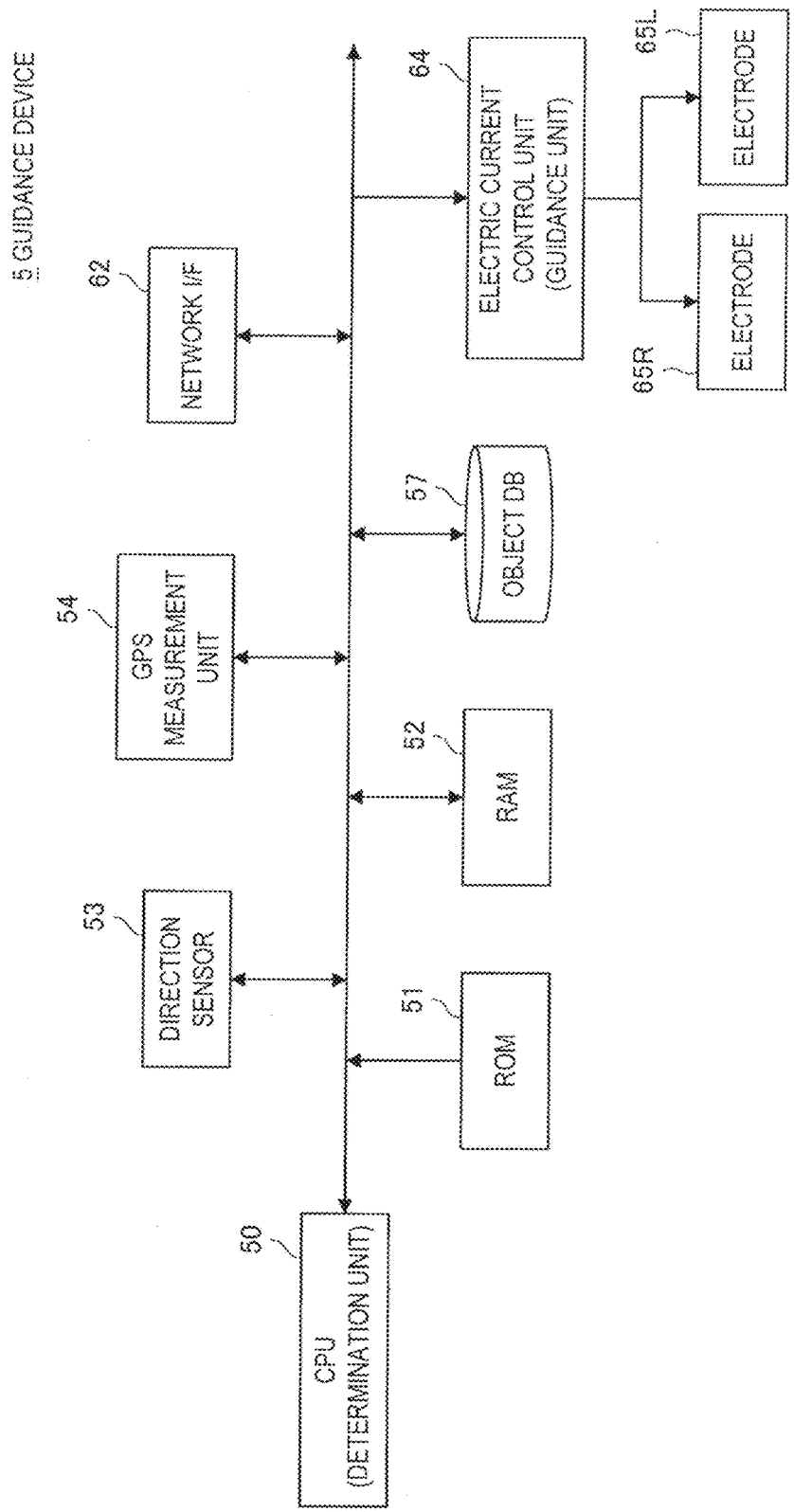
FIG. 15 is a block diagram illustrating the configuration of a guidance device in accordance with the fourth embodiment.

As illustrated in FIG. 15, the guidance device 5 has a CPU 50, ROM 51, RAM 52, a direction sensor 53, a GPS measurement unit 54, an object DB 57, a network interface (I/F) 62, an electric current control unit 64, and electrodes 65R and 65L. Although each configuration will be described below, the description of a block similar to each configuration of the digital camera 1, which has been described with reference to FIG. 2, is omitted herein.

The direction sensor 53 in accordance with the present embodiment outputs as direction information a direction in which a given portion (not shown) of the guidance device 5 is facing.

Similarly to each of the above-described embodiments, the CPU 50 in accordance with the present embodiment also has a function of a determination unit that determines, in accordance with the position information and the direction information, whether a particular object is included in the angle of view visually recognized by a user. Herein, the CPU 50 may estimate the angle of view visually recognized by the user based on information regarding an angular field of view of a human.

Similarly to each of the above-described embodiments, when having determined that a particular object is not included in the angle of view visually recognized by the user, the CPU 50 (the determination unit) also determines a direction in which the user should face in order to visually recognize the particular object.

Similarly to each of the above-described embodiments, the CPU 50 (the determination unit) further has a function of a calculation unit that calculates a displacement degree (a difference) between the direction in which a particular object is present and a direction indicated by the direction information.

The CPU 50 outputs, to the electric current control unit 64, the direction in which the particular object is present and the displacement degree determined in such a manner, and flows electric current directly through the body from the electric current control unit 64 to guide the user.

The electric current control unit 64 controls the direction and the amount of the electric current output from the electrodes 65R and 65L under control by the CPU 50 based on a program in the ROM 51 so that the electric current flows through the user and he/she can be guided in any direction.

Specifically, since the body of the user leans to a side to which an electric current in the positive direction flows, the electric current control unit 64 flows an electric current to the electrode 65 on a side in the direction in which the user should face (the direction in which the particular object is present), which is output from the CPU 50. Herein, the amount of electric current flowed from the electric current control unit 64 may be set to about 1.6 mA, for example, so that the user does not care about a skin stimulus.

The electrodes 65R and 65L are devices to be attached behind ears and capable of flowing electric current directly through the body. Additionally, the polarity of the electrodes 65R and 65L is switched by the electric current control unit 64.

As described above, in accordance with the fourth embodiment, electric current is directly flowed through a user's body so that the user can be guided in a direction in which a particular object is present.

When indicating a particular object in advance, a user can intuitively grasp the direction in which the indicated particular object is present since his/her body leans in one direction in accordance with a direction of electric current flowing from attached electrodes.

When a user does not indicate a particular object in advance, or when the user indicates a plurality of particular objects, the guidance device 5 in accordance with the present embodiment may also inform the user about which particular object he/she is guided to by audio control or display control.

3. Conclusion

As discussed above, the guidance system in accordance with the present embodiment can guide a user to a direction in which a particular object, which is not included in the angle of view visually recognized by the user, can be visually recognized.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the guidance system in accordance with the embodiment of the present disclosure may calculate not only a displacement degree between the horizontal direction of FIG. 4 in which a particular object is present and the image capturing direction, but also a displacement degree in the vertical direction, for example.

Therefore, the guidance system in accordance with the embodiment of the present disclosure can guide the user to correct the displacement in the vertical direction (an angle of an upward and downward orientation) between the direction in which the particular object is present and the image capturing direction. As the user can, by changing the angle of orientation (upward and downward) of the digital camera 1 in accordance with the guidance, have the particular object displayed at the center of the real image, it becomes easier for the user to zoom on the particular object.

In addition, in the guidance system in accordance with the embodiment of the present disclosure, a thumbnail displayed on an end of the screen as a guidance image may be narrower in width (compressed) as the displacement degree is larger.

The digital camera 1 in accordance with the above-described embodiment can, while displaying an image captured in accordance with a timing at which the shutter button is pressed on a part of a display region of the display unit 21, use the other display regions of the display unit 21 as a viewfinder.

In such a case, for example, the digital camera 1 can, by capturing an image of a first tower and performing filtering based on classification information "tower" of the first tower while displaying the captured image on a part of the display region, guide a user to a second tower with which the same classification information "tower" is associated.

Therefore, the user can visually compare the first tower displayed on a part of the display region of the display unit 21 with the second tower shown in the real image obtained by moving the digital camera 1 based on the guidance image and displayed on another display region of the display unit 21.

Additionally, the present technology may also be configured as below.

(1) A client terminal including:
a determination unit that determines, based on position information associated with a particular object, whether the particular object is included in an angle of view visually recognized by a user; and
a guidance unit that guides the user when the determination unit determines that the particular object is not included in the angle of view visually recognized by the user.
(2) The client terminal according to (1), wherein the guidance unit guides the user by sending a notice to the user, directly applying pressure to a body of the user, or flowing electric current through the body based on a determination result of the determination unit.
(3) The client terminal according to (1) or (2),
wherein, when the particular object is not included in the angle of view visually recognized by the user, the determination unit determines a direction in which the user is to face for visually recognizing the particular object, and
wherein the guidance unit informs the user of the direction determined by the determination unit.
(4) The client terminal according to (3), further including:
an image capturing unit; and
a display control unit that controls display of a captured image that is captured by the image capturing unit,
wherein the display control unit realizes the notice of the guidance unit to the user by superimposing and displaying, on the captured image, a guidance image for guiding the user in the direction determined by the determination unit.
(5) The client terminal according to (4), wherein the guidance image is, on a screen on which the captured image is displayed, superimposed and displayed on an end of a screen corresponding to the direction determined by the determination unit.
(6) The client terminal according to (4) or (5), wherein the display control unit controls at least one of a size, gradation, or transmittance of the guidance image in accordance with a displacement degree between a direction in which the particular object is present and that is based on the position information associated with the particular object and an image capturing direction of the image capturing unit.
(7) The client terminal according to any one of (4) to (6), wherein the guidance image is a thumbnail of the particular object.
(8) The client terminal according to any one of (4) to (7),
wherein the guidance image is an arrow indicative of the direction determined by the determination unit, and
wherein the display control unit controls at least one of a size, a length, a line weight, gradation, or transmittance of the arrow in accordance with a displacement degree between a direction in which the particular object is present and that is based on the position information associated with the particular object and an image capturing direction of the image capturing unit.
(9) The client terminal according to any one of (4) to (8),
wherein classification information is associated with the particular object, and
wherein the display control unit displays the guidance image for guiding the user in the direction the user is to face for visually recognizing the particular object that has been filtered based on the classification information.
(10) A server including:
a storage unit that stores position information associated with a particular object;
a receiving unit that receives, from a client terminal, visual recognition information for estimating an angle of view visually recognized by a user;
a determination unit that determines, based on the position information, whether the particular object is included in the angle of view, which is estimated based on the visual recognition information, visually recognized by the user; and
a transmitting unit that transmits, to the client terminal, control information for guiding the user when the determination unit determines that the particular object is not included in the angle of view visually recognized by the user.
(11) A recording medium having a program recorded thereon, the program being configured to cause a computer to execute:
a process of determining, based on position information associated with a particular object, whether the particular object is included in an angle of view visually recognized by a user; and
a process of guiding the user when the process of determining determines that the particular object is not included in the angle of view visually recognized by the user.
(12) A recording medium having a program recorded thereon, the program being configured to cause a computer to execute:
a process of receiving, from a client terminal, visual recognition information for estimating an angle of view visually recognized by a user;
a process of determining, based on position information associated with the particular object, whether the particular object is included in the angle of view, which is estimated based on the visual recognition information, visually recognized by the user; and
a process of transmitting, to the client terminal, control information for guiding the user when the process of determining determines that the particular object is not included in the angle of view visually recognized by the user.

The present disclosure contains subject matter related to that disclosed in Japanese Priority Patent Application JP 2012-048144 filed in the Japan Patent Office on Mar. 5, 2012, the entire content of which is hereby incorporated by reference.

What is claimed is:
1. A client terminal, comprising:
a display screen; and
a processor configured to:
determine, based on corresponding position information associated with each of a plurality of objects, inclusion of the plurality of objects in a user's angle of view;
generate a plurality of guidance images that are configured to guide user navigation of the client terminal, wherein the plurality of guidance images are generated based on a determination that a first plurality of objects of the plurality of objects are excluded from the user's angle of view;

control the display screen to display a first guidance image of the plurality of guidance images, a second guidance image of the plurality of guidance images, and a captured image,
  wherein the first guidance image includes an arrow and a first thumbnail indicating a first object of the first plurality of objects,
  wherein a first direction in which the first guidance image of the plurality of guidance images is displayed on the display screen is based on a second direction in which the first object of the first plurality of objects is present relative to the display screen,
  wherein the second direction is determined based on the position information associated with the first object,
  wherein the arrow is indicative of a first position of the first object in the second direction,
  wherein a third direction in which the second guidance image of the plurality of guidance images is displayed on the display screen is based on a fourth direction in which a second object of the first plurality of objects is present relative to the display screen, and
  wherein the fourth direction is determined based on the position information associated with the second object;
control the display screen to superimpose at least a portion of the second guidance image corresponding to the second object on the first guidance image corresponding to the first object,
  wherein the second direction corresponding to the first object is different from the fourth direction corresponding to the second object;
move a display position of at least one guidance image of the plurality of guidance images towards a center of the display screen based on a movement of the client terminal in one of the second direction or the fourth direction to include corresponding one of the first object or the second object in the user's angle of view;
select a third object of the first plurality of objects based on an operation history that is associated with the client terminal,
  wherein the operation history includes historical information that indicates at least one of a zoom operation, a focus operation, or an image capturing operation associated with the third object; and
control the display screen to display a third guidance image of the plurality of guidance images based on the third object.

2. The client terminal according to claim 1, wherein the processor is further configured to:
  determine, based on a determination that the third object of the first plurality of objects is excluded from the user's angle of view, a fifth direction corresponding to the third object; and
  notify the determined fifth direction to a user, wherein the fifth direction indicates a direction of user navigation of the client terminal.

3. The client terminal according to claim 1, wherein the processor is further configured to control a size of the at least one guidance image of the plurality of guidance images, based on a displacement degree between a fifth direction in which a fourth object of the first plurality of objects is present and an image capturing direction of an image sensor of the client terminal.

4. The client terminal according to claim 1,
  wherein the processor is further configured to control at least one of a size, a length, a line weight, a color gradation, or a transmittance of the arrow, based on a displacement degree between the second direction and an image capturing direction of an image sensor of the client terminal.

5. The client terminal according to claim 1,
  wherein classification information is associated with the third object,
  wherein the processor is further configured to:
    filter the third object based on the classification information, and
    control the display screen to further display the third guidance image that corresponds to inclusion of the filtered third object in the user's angle of view.

6. The client terminal according to claim 1, wherein the at least one guidance image of the plurality of guidance images graphically indicates the fourth direction.

7. The client terminal according to claim 1, wherein the processor is further configured to control a display proportion of the at least one guidance image of the plurality of guidance images, based on a displacement degree between a fifth direction in which a fourth object of the first plurality of objects is present and an image capturing direction of an image sensor of the client terminal.

8. The client terminal according to claim 1, wherein the processor is further configured to control gradation of the at least one guidance image of the plurality of guidance images, based on a displacement degree between a fifth direction in which a fourth object of the first plurality of objects is present and an image capturing direction of an image sensor of the client terminal.

9. The client terminal according to claim 1, wherein the processor is further configured to control transmittance of the at least one guidance image of the plurality of guidance images, based on a displacement degree between a fifth direction in which a fourth object of the first plurality of objects is present and an image capturing direction of an image sensor of the client terminal.

10. The client terminal according to claim 1,
  wherein, based on a second position of the second object that is hidden behind a subject of the captured image, the processor is further configured to superimpose the at least one guidance image of the plurality of guidance images on the captured image, and
  wherein the at least one guidance image of the plurality of guidance images guides the user navigation towards the second position of the hidden second object.

11. The client terminal according to claim 1, wherein the operation history that is associated with the client terminal corresponds to user preference related to the third object.

12. A method, comprising:
in a server:
  receiving, from a client terminal, visual recognition information for estimating a user's angle of view;
  estimating the user's angle of view based on the received visual recognition information;
  determining, based on corresponding position information associated with each of a plurality of objects, inclusion of the plurality of objects in the estimated user's angle of view; and
  transmitting, to the client terminal, control information for guiding user navigation of the client terminal, based on a determination that a first plurality of objects of the plurality of objects are excluded from the user's angle of view,
wherein the client terminal displays on a display screen, based on the control information, a first guidance image of a plurality of guidance images, a second guidance image of the plurality of guidance images, and a captured image,
wherein the first guidance image includes an arrow and a first thumbnail indicating a first object of the first plurality of objects,
wherein a first direction in which the first guidance image of the plurality of guidance images is displayed on the display screen is based on a second direction in which the first object of the first plurality of objects is present relative to the display screen,
wherein the second direction is determined based on the position information associated with the first object,
wherein the arrow is indicative of a first position of the first object in the second direction,
wherein a third direction in which the second guidance image of the plurality of guidance images is displayed on the display screen is based on a fourth direction in which a second object of the first plurality of objects is present relative to the display screen,
wherein the fourth direction is determined based on the position information associated with the second object,
wherein at least a portion of the second guidance image corresponding to the second object is superimposed on the first guidance image corresponding to the first object,
wherein the second direction corresponding to the first object is different from the fourth direction corresponding to the second object,
wherein the client terminal moves a display position of at least one guidance image of the plurality of guidance images towards a center of the display screen based on a movement of the client terminal in one of the second direction or the fourth direction to include corresponding one of the first object or the second object in the user's angle of view,
wherein a third object of the first plurality of objects is selected based on an operation history that is associated with the client terminal, and
wherein the operation history includes historical information that indicates at least one of a zoom operation, a focus operation, or an image capturing operation associated with the third object.

13. A non-transitory computer-readable medium having stored thereon, computer-executable instructions which, when executed by a processor, cause the processor to execute operations, the operations comprising:
determining, based on corresponding position information associated with each a plurality of objects, inclusion of the plurality of objects in a user's angle of view;
generating a plurality of guidance images for guiding user navigation of a client terminal, wherein the plurality of guidance images are generated based on a determination that a first plurality of objects of the plurality of objects are excluded from the user's angle of view;
controlling a display screen of the client terminal to display a first guidance image of the plurality of guidance images, a second guidance image of the plurality of guidance images, and a captured image,
wherein the first guidance image includes an arrow and a first thumbnail indicating a first object of the first plurality of objects,
wherein a first direction in which the first guidance image of the plurality of guidance images is displayed on the display screen is based on a second direction in which the first object of the first plurality of objects is present relative to the display screen,
wherein the second direction is determined based on the position information associated with the first object,
wherein the arrow is indicative of a first position of the first object in the second direction,
wherein a third direction in which the second guidance image of the plurality of guidance images is displayed on the display screen is based on a fourth direction in which a second object of the first plurality of objects is present relative to the display screen, and
wherein the fourth direction is determined based on the position information associated with the second object;
controlling the display screen to superimpose at least a portion of the second guidance image corresponding to the second object on the first guidance image corresponding to the first object,
wherein the second direction corresponding to the first object is different from the fourth direction corresponding to the second object;
moving a display position of at least one guidance image of the plurality of guidance images towards a center of the display screen based on a movement of the client terminal in one of the second direction or the fourth direction to include corresponding one of the first object or the second object in the user's angle of view;
selecting a third object of the first plurality of objects based on an operation history that is associated with the client terminal,
wherein the operation history includes historical information that indicates at least one of a zoom operation, a focus operation, or an image capturing operation associated with the third object; and
controlling the display screen to display a third guidance image of the plurality of guidance images based on the third object.

14. A non-transitory computer-readable medium having stored thereon, computer-executable instructions which, when executed by a processor, cause the processor to execute operations, the operations comprising:
receiving, from a client terminal, visual recognition information for estimating a user's angle of view;
estimating the user's angle of view based on the received visual recognition information;
determining, based on corresponding position information associated with a plurality of objects, inclusion of the plurality of objects in the estimated user's angle of view; and
transmitting, to the client terminal, control information for guiding user navigation of the client terminal, based on a determination that a first plurality of objects of the plurality of objects are excluded from the user's angle of view,
wherein the client terminal displays on a display screen, based on the control information, a first guidance image of a plurality of guidance images, a second guidance image of the plurality of guidance images, and a captured image, wherein the first guidance image includes an arrow and a first thumbnail indicating a first object of the first plurality of objects, wherein a first direction in which the first guidance image of the plurality of guidance images is displayed on the display screen is based on a second direction in which the first object of the first plurality of objects is present relative to the display screen, wherein the second direction is determined based on the position information associated with the first object, wherein the arrow is indicative of a first position of the first object in the second direction, wherein a third direction in which the second guidance image of the plurality of guidance images is displayed on the display screen is based on a fourth direction in which a second object of the first plurality of objects is present relative to the display screen, and wherein the fourth direction is determined based on the position information associated with the second object, wherein at least a portion of the second guidance image corresponding to the second object is superimposed on the first guidance image corresponding to the first object, wherein the second direction corresponding to the first object is different from the fourth direction corresponding to the second object, wherein the client terminal moves a display position of at least one guidance image of the plurality of guidance images towards a center of the display screen based on a movement of the client terminal in one of the second direction or the fourth direction to include corresponding one of the first object or the second object in the user's angle of view, wherein a third object of the first plurality of objects is selected based on an operation history that is associated with the client terminal, and wherein the operation history includes historical information that indicates at least one of a zoom operation, a focus operation, or an image capturing operation associated with the third object.

* * * * *